US005697529A

United States Patent [19]

Lecomte

[11] Patent Number: 5,697,529

[45] Date of Patent: Dec. 16, 1997

[54] REFILLABLE PACKAGING

[75] Inventor: Olivier Lecomte, Bellegarde, France

[73] Assignee: Rexam Reboul, Cran-Gevrier Cedex, France

[21] Appl. No.: 545,666

[22] PCT Filed: Mar. 17, 1995

[86] PCT No.: PCT/FR95/00331

§ 371 Date: Nov. 2, 1995

§ 102(e) Date: Nov. 2, 1995

[87] PCT Pub. No.: WO95/26832

PCT Pub. Date: Oct. 12, 1995

[30] Foreign Application Priority Data

Mar. 30, 1994 [FR] France .................................. 94 03780

[51] Int. Cl.$^{6}$ ................................................ G01F 11/00

[52] U.S. Cl. ......................... 222/256; 222/340; 222/327; 222/383.1; 222/387

[58] Field of Search .................................... 222/130, 183, 222/173, 383.1, 340, 256, 380, 387, 327

[56] References Cited

U.S. PATENT DOCUMENTS 4,796,786 1/1989 Czech ...................................... 222/256
5,465,873 11/1995 Mejean et al. ...................... 222/380 X

*Primary Examiner*—Gregory L. Huson
*Attorney, Agent, or Firm*—Ladas & Parry

[57] ABSTRACT

Rechargeable packaging for dispensing fluid substances having a bell-shaped case (1) through which passes a manual plunger (2), which has an orifice (3) providing a passage for a dispensing nozzle (30) and the open base of which is closed by a removable base (5). The interior of the case housing has a replaceable cartridge (4) comprising an inverted pot shaped container (6) with a bottom (7) that is free to move axially and the top face of which has an orifice (15) communicating with a dispensing nozzle (30) via a dispensing device (16, 32) actuated by the plunger. The container and the case have cooperating means (10, 11) for locating the cartridge in the case, the cartridge being secured in the case by its base (5).

20 Claims, 5 Drawing Sheets

REFILLABLE PACKAGING

The present invention concerns the industrial packaging of fluid substances such as cosmetic, pharmaceutical, hygiene and housework substances in pots.

Packaging such substances in pots is practical but taking the substance directly from the pot on the finger or on an instrument causes soiling and the wide opening facilitates pollution, drying and oxidation by exposure to air each time that some product is removed. Closed packaging with a pump or pressurized dispensing device was therefore developed to overcome these drawbacks. Various types of packaging of this kind are disclosed in the documents WO-A-93 25447, EP-A-0 526 811 and U.S. Pat. No. 4,872,596. Such packaging is more costly, however, and often unesthetic in appearance, especially if cheap materials are used to reduce costs. Especially in the case of cosmetic and hygiene products to remain on show in bathrooms or in hairdressing salons, a pleasing appearance is required, and the packaged product must not deteriorate, since it is often of a relatively high cost.

To meet the demand from consumers for a high-quality, even luxurious, presentation at an affordable price, consideration has been given to using the same exterior packaging adapted to be refilled an unspecified number of times using interchangeable cartridges each having a dispensing device (see U.S. Pat. No. 5,190,191). The aim of the invention is to avoid any laborious, delicate or soiling operation in refilling the packaging and to prevent wear or clogging of a multiple-use dispensing device.

The invention consists in a rechargeable packaging for dispensing fluid substances comprising a bell-shaped case closed by a removable base, having a captive manual plunger passing through it and providing a passage for a dispensing nozzle; the interior of the case housing a replaceable cartridge comprising an inverted pot container with a mobile bottom and a top face of which carries a dispensing device associated with a dispensing nozzle; the container and the case having cooperating means for locating and immobilizing the cartridge in the case, the dispensing device being extended by an actuator rod the free end of which has means for temporarily connecting it to complementary means at the free end of the plunger, wherein said cartridge includes a leaf spring exterior to the dispensing device, an external free end of the actuator rod has an enlargement connected to the plunger through which the leaf spring applies traction to the actuator rod, an inside free end of the plunger has an inclined part facing the cartridge forming a cam that cooperates with the leaf spring on insertion of a cartridge into the case to deploy the free end of the actuator rod and to enable insertion and retention of the enlargement at its end in a T-section groove parallel to the axis of the cartridge and open at its ends and laterally.

The dispensing device carried by the container can be a suction-discharge pump with non-return valves, which has the advantage of metered dispensing, or a slide or other valve type closure device. In this case a compression spring bearing against the base of the case bears against the mobile base of the container at all times.

In practise, the lips of the groove are advantageously elastically deformable and cause the enlargement on the rod to be clipped into the groove on the plunger by finger pressure of the user on the plunger when a cartridge is first used.

The spring may comprise a circular arc-shape leaf spring the free ends of which are braced against parallel abutments upstanding from the top wall of the container and the actuator rod passes freely through the central part of the leaf spring.

Alternatively, the spring can be a circular arc shape leaf spring the free ends of which are braced against parallel abutments attached to the plunger and the central part of the leaf spring is fixed to a support upstanding from the top wall of the container.

The spring can instead comprise a circular arc shaped wall of the plunger opposite the face on which the finger of the user presses, the central part of the circular arc shaped wall abutting against a bracket upstanding from the top wall of the container.

The invention also consists of a replaceable cartridge for packaging of the invention comprising a container with a mobile bottom and the top wall of which is attached to a dispensing device associated with a dispensing nozzle and having an actuator rod adapted to be automatically connected to a plunger that is captive in a case receiving the cartridge.

In an advantageous embodiment the dispensing device includes an actuator rod the free end of which is protected by a circular arc shaped leaf spring the central part of which has an opening through which the rod passes freely.

A better understanding of the invention will result from an examination of and the detailed description of the appended drawings which show one embodiment of the invention and one variant thereof, chosen by way of example from many possible embodiments, adaptations and variants of the invention that will suggest themselves to a person skilled in the art.

In the drawings.

In these figures, corresponding components are denoted by the same reference numbers, possibly with a suffix. To clarify the drawings the dimensions and proportions of these components are not necessarily to scale.

Figure 1:
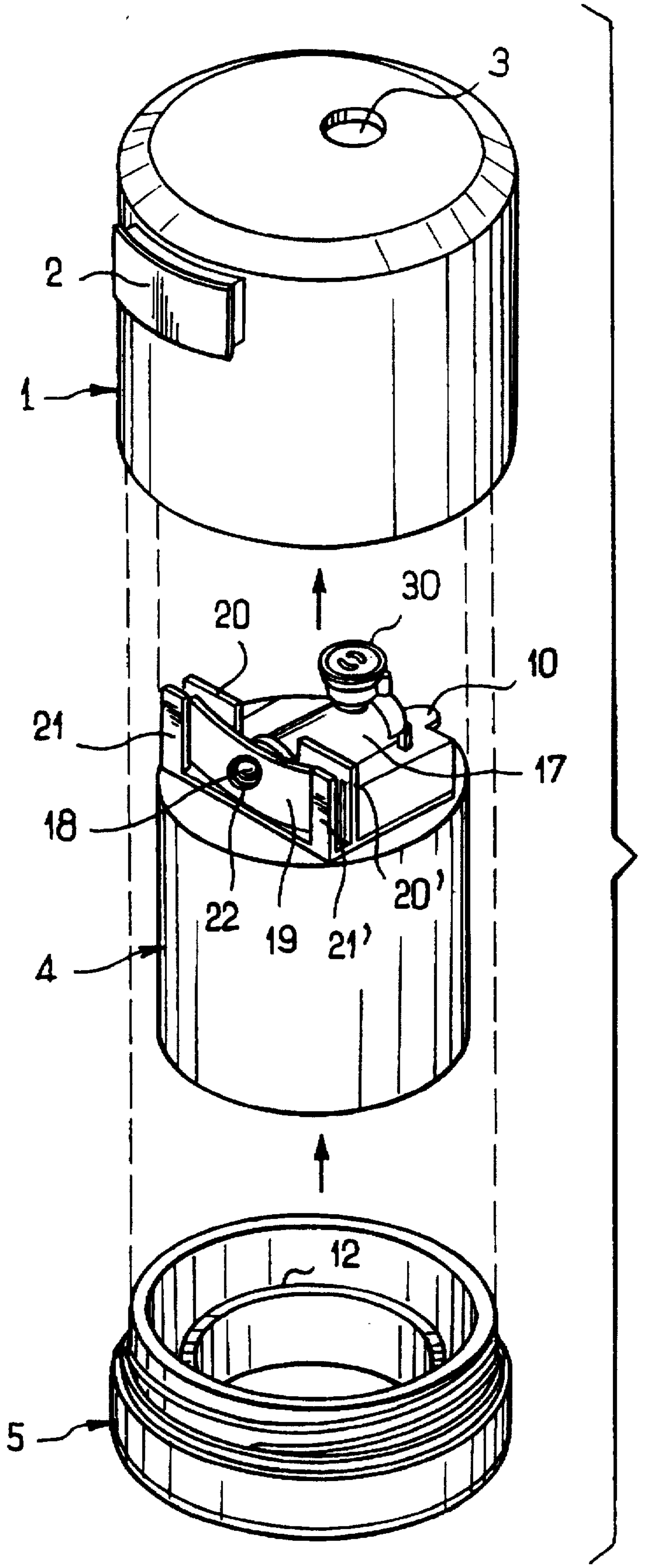
FIG. 1 is a diagrammatic exploded perspective view of packaging in accordance with the invention comprising a case, a cartridge and a base.

The packaging of the invention shown in FIGS. 1 to 4 essentially comprises a bell-shaped case 1 with a manual plunger 2 passing through the side wall and with an orifice 3 in the top wall in line with the plunger. A replaceable cartridge 4 is inserted into the case by axial translatory movement and is retained and immobilized therein by a base 5 which screws into the open bottom of the case.

Figure 2:
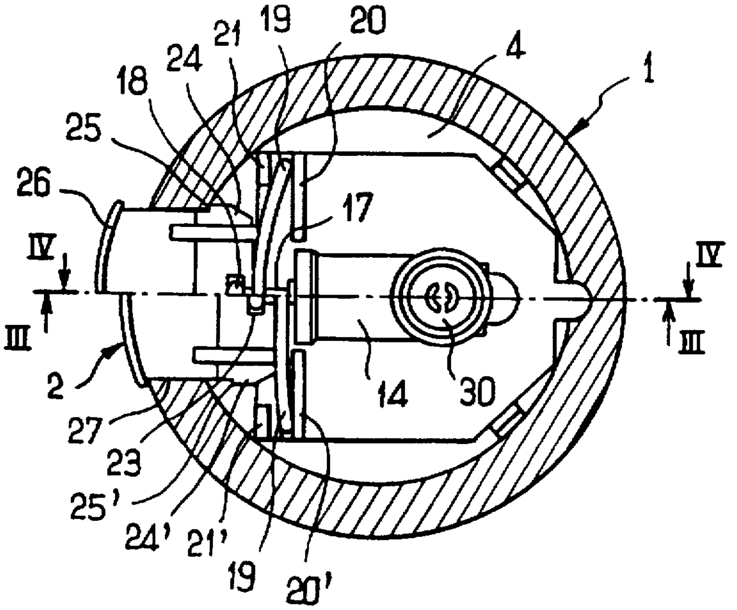
FIG. 2 is a diagrammatic top view of the cartridge of the packaging from FIG. 1, shown inside the case shown in section on the line II—II in FIG. 3, in unoperated and end of dispensing positions.
Figure 3:
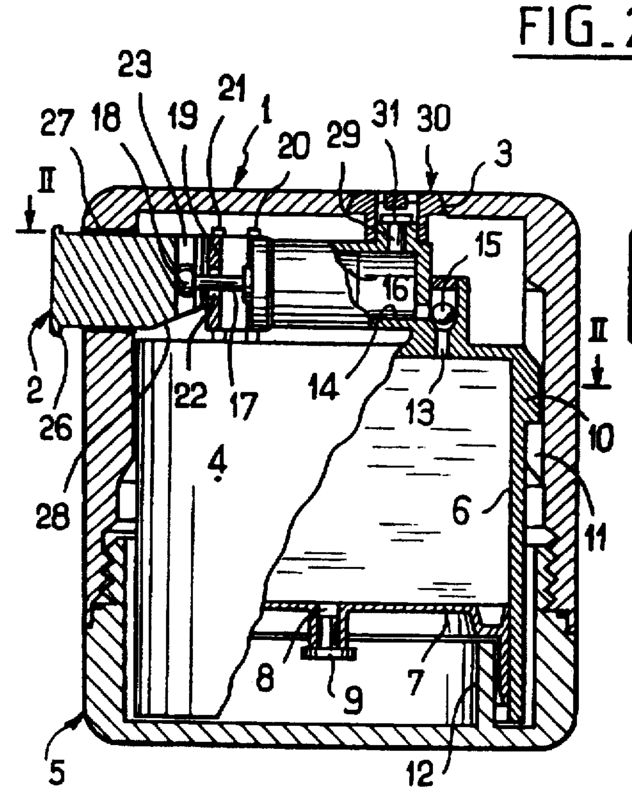
FIG. 3 is a diagrammatic view of the unoperated packaging partly in section on the line III—III in FIG. 2.
Figure 4:
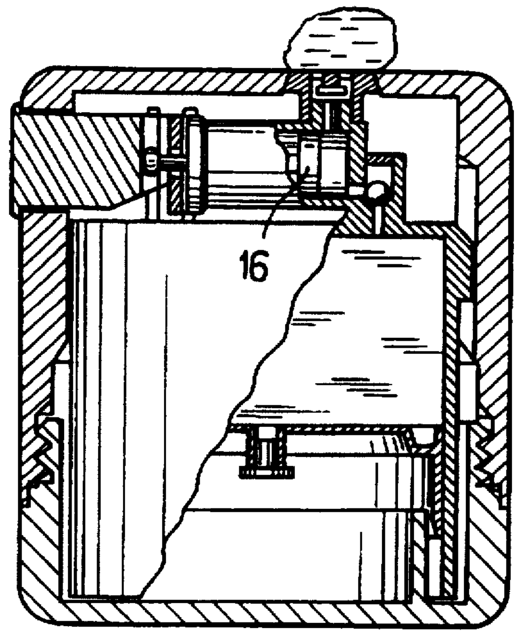
FIG. 4 is a view analogous to that of FIG. 3 showing the packaging at the end of dispensing in section on the line IV—IV in FIG. 2.

The cartridge 4 comprises a container 6 in the form of an inverted pot the open bottom of which is closed by a free piston 7 with an orifice 8 for filling the container at the center, closed by a plug 9. The lateral face of the container carries a lug 10 for orienting the cartridge in the case and which cooperates with a longitudinal groove 11 on the inside of the lateral wall of the case so that the cartridge is correctly oriented when inserted in the case. An annular rib 12 on the base 5 prevents the piston 7 from escaping inadvertently. An orifice 13 in the top wall of the container 6 communicates with the interior of a pump cylinder 14 attached to the top wall of the container via a non-return ball valve 15. The piston 16 of the pump is extended by an actuator rod 17 passing through a circular arc shape leaf spring 19 the free ends of which are braced against parallel abutments 20, 21 and 20', 21' upstanding from the top wall of the container. The central part of the leaf spring 19 includes an opening 22 through which the piston rod 17 passes freely. The rod 17 ends at an enlargement 18 through which the leaf spring 19 applies traction to it, through the intermediary of the plunger 2 inside the case, when the enlargement 18 is trapped in a T-shaped axial groove 25 with elastically deformable lips in the free end of the plunger 2 (FIGS. 2, 3 and 4).

The plunger 2 has two flexible tongues 24, 24' at the sides with lugs 25, 25' on the outside which cooperate with a bead 26 around the outside end of the plunger to hold it captive in a slot 27 in the wall of the case but free to move to either side of the side wall of the case through which it passes. The bottom face of the plunger, facing the cartridge, ends in an inclined portion 28 which acts as a cam on insertion of a cartridge into the case to push back the leaf spring 19 and the plunger if they are not in the correct position, to enable the enlargement 18 at the end of the piston rod 17 to enter the T-section groove 23 in the end of the plunger.

The cylinder 14 also communicates via an orifice 29 with a dispensing nozzle 30 enclosing a flat non-return valve 31. This frustoconical nozzle 30 is inserted in the complementary shape orifice 3 in the top wall of the case 1 when the cartridge 4 is fitted into the case.

Except for friction forces on it, the rod actuating the dispensing device is free to move when it is not engaged with the plunger, as in a replacement cartridge that has not yet been inserted into the case. To prevent inadvertent operation of the dispensing device of a cartridge outside the case, the length of the actuator rod is such that, when fully depressed, the enlargement at the end of the rod does not project out of the arcuate spring. It is therefore impossible for a user to pick up the cartridge and inadvertently actuate the rod, and this guarantees that a replacement cartridge will not have been used.

When a cartridge is inserted into the case, if the plunger is depressed it is pushed back by its inclined part 28 which bears against and slides on the outside upper edge of the spring 19, the enlargement 18 at the end of the rod being protected by the spring. The user then has only to press on the plunger to compress the spring, release the end of the actuator rod and force the enlargement at its end to push the lips of the groove 23 elastically apart in order to clip behind them. The plunger is then engaged with the rod and the packaging is ready for use.

When a cartridge is removed from the case, by translatory axial movement after unscrewing the base 5, the enlargement at the end of the actuator rod of the dispensing member slides freely along the groove 23 until it is released from the groove, which allows the spring to relax. When the cartridge has been removed, the actuator rod remains in the unoperated end of travel position and projects out of the spring, indicating that the cartridge has been used. If a cartridge in this condition is inserted into the case, the deployed plunger, unless pushed back by its inclined part, presents the open end of its groove in a position to receive the enlargement at the end of the rod which slides freely therein when the cartridge is pushed into the case, guided axially by its orienting lug 10 engaged in the cooperating longitudinal groove 11 in the case.

Figure 5:
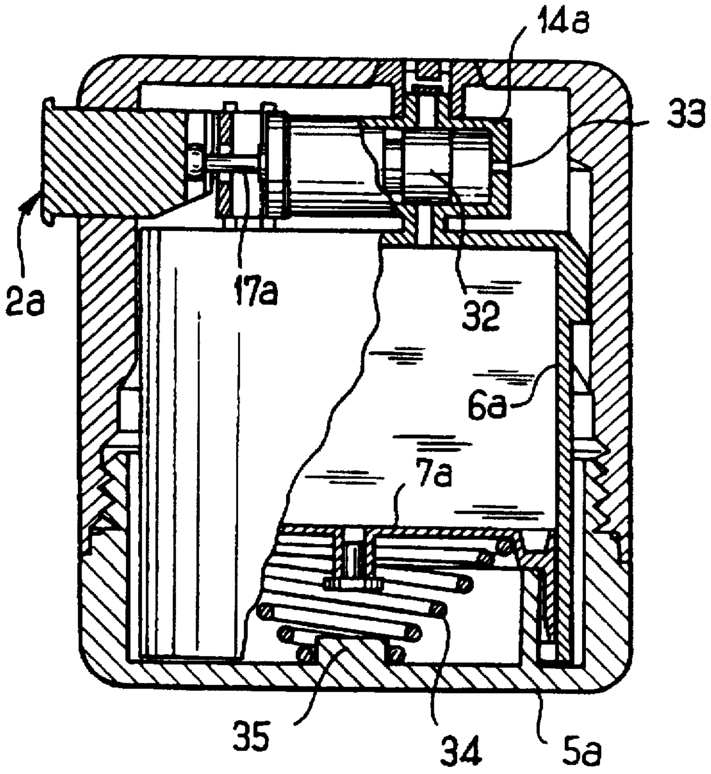
FIGS. 5 and 6 are views analogous to those of FIGS. 3 and 4, respectively, of a first variant.
Figure 6:
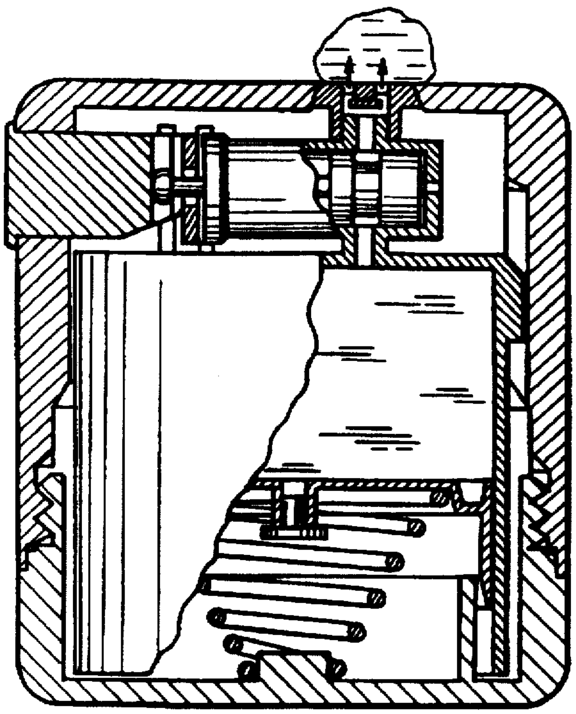

In the first variant shown in FIGS. 5 and 6 the same components are provided in the same relative positions, except that the pump is replaced by a slide valve type dispenser 32 the cylinder **14*a* of which has an air inlet orifice 33 in the bottom to enable free movement of the slide valve, which is actuated by a rod 17*a* identical to the piston rod of the previous example. A conical compression spring 34 bears against the base 5*a* to exert constant pressure on the free piston 7*a* closing the bottom of the container 6*a*, in which it is centered by an axial stud 35 upstanding from the base 5*a*. This embodiment does not require any non-return valves and the packaged product is dispensed continuously for as long as the user depresses the plunger 2*a***.

Figure 8:
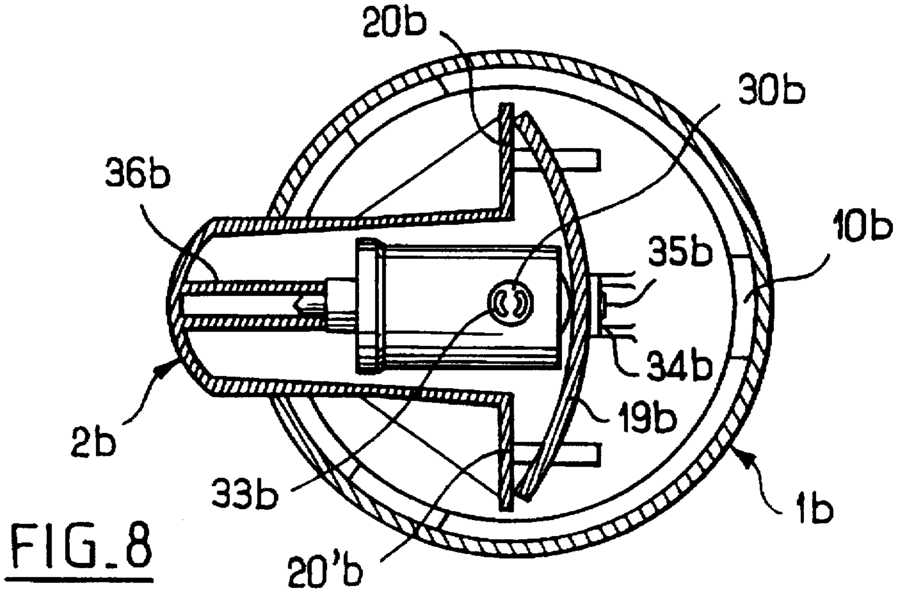
FIG. 8 is a diagrammatic view partly in section on the line VIII—VIII in FIG. 7.
Figure 7:
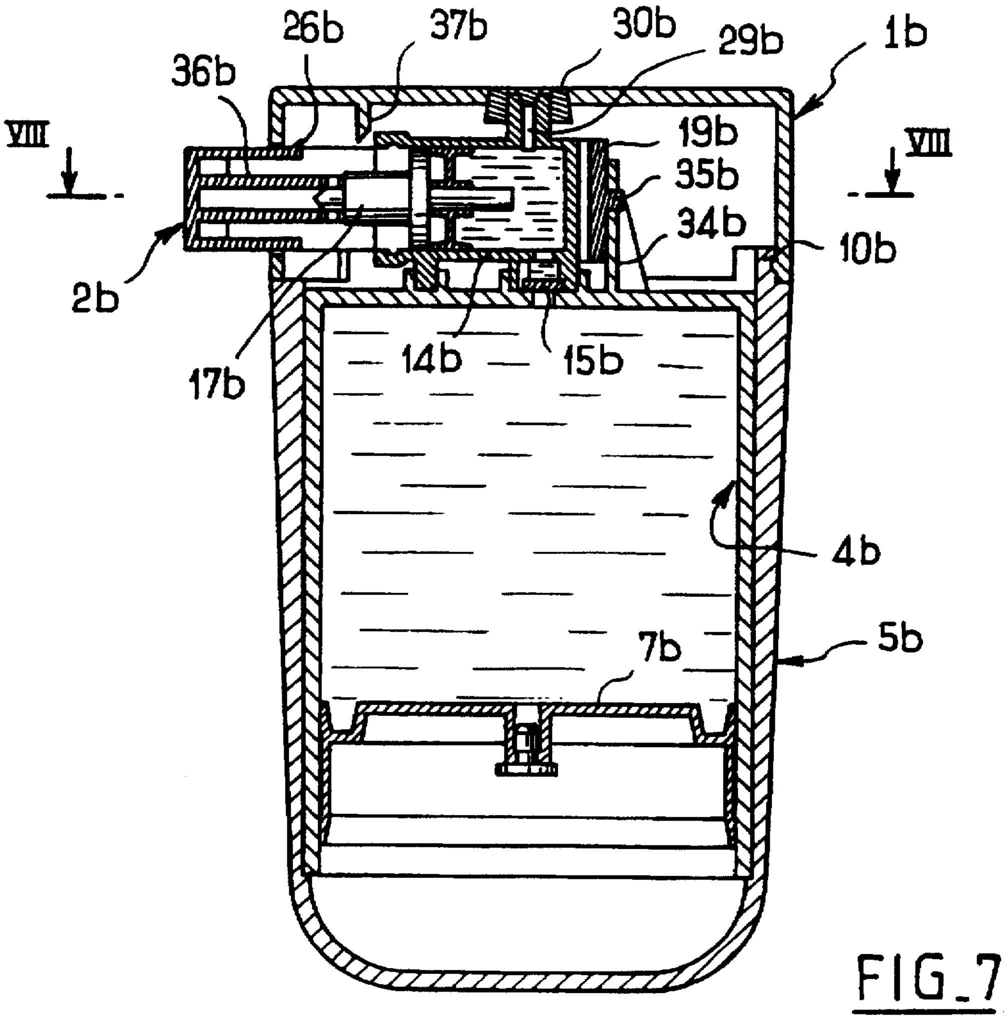
FIG. 7 is a view analogous to that of FIG. 3 of a second variant.

In the second variant shown in FIGS. 7 and 8 a cartridge **4*b* has a pump 14*b* on the top with a free piston extended by an actuator rod 17*b*. There is a valve 15*b* at the pump inlet and a nozzle 30*b* at its outlet. The elastic material nozzle has two circular arc shape slots 33*b* which, in the unoperated position, are closed off by the edge of the outlet passage 29*b* of the pump (FIG. 7) and which separate elastically to allow the product to be dispensed to escape as a result of the pressure exerted by the pump (FIG. 8). The cartridge is inserted into a base 5*b* onto which is nested and clipped a cover 1*b* guided and oriented by three lugs 10*b***.

A bracket **34*b* upstanding from the top wall of the cartridge 4*b* has an orifice into which a central lug 35*b* on a circular arc shaped leaf spring 19*b* clips. A T-shape plunger 2*b* trapped in a lateral opening in the cover 1*b* is free to move axially. The lateral branches 20*b*, 20'*b* of the T-shape brace the free ends of the spring 19*b*. A tubular axial stud 36*b* on the plunger traps the enlarged end of the actuator rod 17*b* of the pump in a slot, as in the previous embodiments. The plunger 2*b* is movably retained in the cover 1*b* by a lug 26*b* cooperating with an abutment 37*b* upstanding from the inside of the cover 1*b***.

Figure 11:
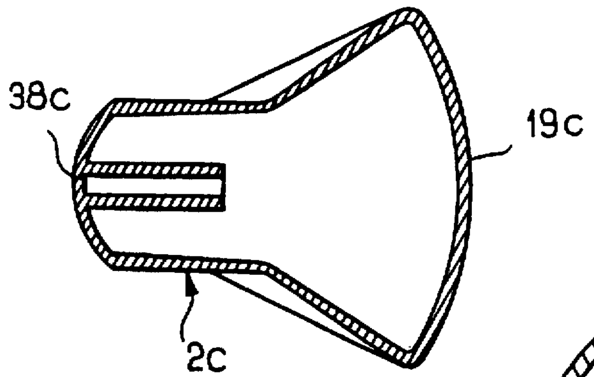
FIG. 11 is a diagrammatic view in axial section of the plunger-spring of the unoperated packaging from FIG. 10.
Figure 10:
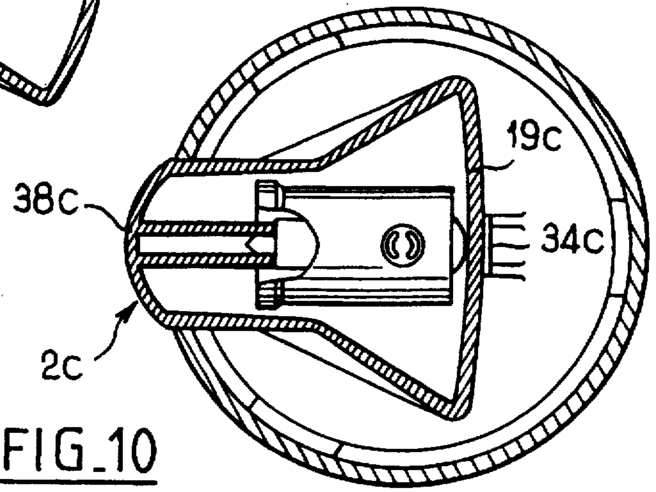
FIG. 10 is a diagrammatic view partly in section on the line X—X in FIG. 9.
Figure 9:
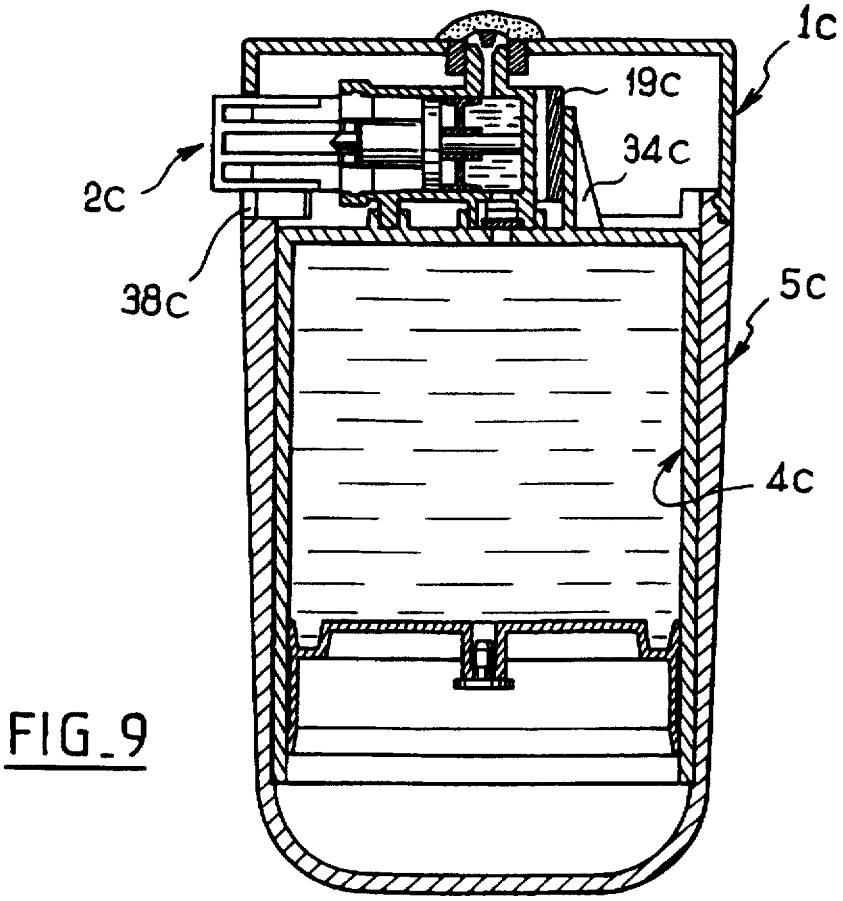
FIG. 9 is a view analogous to that of FIG. 7 showing a third variant at the end of dispensing.

The third variant, shown in FIGS. 9 through 11, differs from the second variant shown in FIGS. 7 and 8 only in that the spring is an end wall **19*c* of the plunger 2*c* opposite the face 38*c* to which the finger of the user is applied. This wall is circular arc shaped when unstressed (FIG. 11). It is flattened elastically against the bracket 34*c* when the plunger is depressed (FIGS. 9 and 10**).

In this variant, the plunger can be captive in the cover, as in the variant of FIGS. 7 and 8, or attached to the cartridge **4*c*, the cover 1c then having a notch 38*c* through which the plunger 2*c* passes (FIG. 9**).

I claim:

1. Rechargeable packaging for dispensing fluid substances comprising a bell-shaped case (1) closed by a removable base, having a captive manual plunger (2, **2*b*, or 2*c*) passing through it and providing a passage for a dispensing nozzle (30); the interior of said case housing a replaceable cartridge (4) comprising an inverted pot container (6, 6*b*, or 6*c*) with a mobile bottom (7 or 7*a*) and a top face of which carries a dispensing device (16, 32) associated with a dispensing nozzle (30); said container and said case having cooperating means (10, 11) for locating and immobilizing said cartridge in said case, said dispensing device (16, 32) being extended by an actuator rod (17) having a free end, the free end of the actuator rod (17) having means (18) for temporarily connecting it to complementary means (23**) at a free end of said plunger, wherein said cartridge includes a leaf spring (19) exterior to said dispensing device (16, 32), the free end of said actuator rod (17) has an enlargement (18) connected to said plunger (2) through which said leaf spring (19, 19*b*, or 19*c*) applies traction to said actuator rod, the free end of said plunger has an inclined part (28) facing said cartridge forming a cam that cooperates with said leaf spring on insertion of a cartridge into said case to deploy said free end of said actuator rod and to enable insertion and retention of said enlargement (18) on the free end of the actuator rod (17) in a T-section groove (23).

2. Packaging according to claim 1 wherein said spring is a circular arc shaped wall (19*c*) of said plunger (2*c*) opposite a face to which a finger of a user is applied, a central part of said circular arc shaped wall abutting against a bracket (34*c*) upstanding from a top wall of said container (6*c*).

3. Packaging according to claim 1 wherein said dispensing device carried by said container is a suction-discharge pump (14) with non-return valves (15, 31).

4. Packaging according to claim 1 wherein said dispensing device carried by said container is a slide or other valve type closure device (32), the mobile bottom (7*a*) of said container being acted on at all times by a compression spring bearing (34) against a base (5*a*) of said case.

5. Packaging according to claim 1 wherein the actuator rod is adapted to be automatically connected to the plunger that is captive in the case receiving said cartridge.

6. Packaging according to claim 5 wherein the free end of the actuator rod is protected by the spring, the spring having an opening through which said rod passes freely.

7. Packaging according to claim 1 wherein the T-section groove (23) has elastically deformable lips, the lips clipping said enlargement on said rod into said groove on said plunger as the result of pressure of a finger of a user on said plunger when a cartridge is first used.

8. Packaging according to claim 7 wherein said dispensing device carried by said container is a suction-discharge pump (14) with non-return valves (15, 31).

9. Packaging according to claim 7 wherein said dispensing device carried by said container is a slide or other valve type closure device (32), the mobile bottom (7*a*) of said container being acted on at all times by a compression spring bearing (34) against a base (5*a*) of said case.

10. Packaging according to claim 7 wherein the actuator rod is adapted to be automatically connected to the plunger that is captive in the case receiving said cartridge.

11. Packaging according to claim 10 wherein the free end of the actuator rod is protected by the spring, the spring having an opening through which said rod passes freely.

12. Packaging according to claim 1 wherein said spring is a circular arc shaped leaf spring (19) the free ends of which are braced against parallel abutments (20, 21) upstanding from a top wall of said container (6) and said actuator rod (17) passes freely through a central part of said leaf spring.

13. Packaging according to claim 12 wherein said dispensing device carried by said container is a suction-discharge pump (14) with non-return valves (15, 31).

14. Packaging according to claim 12 wherein said dispensing device carried by said container is a slide or other valve type closure device (32), the mobile bottom (7*a*) of said container being acted on at all times by a compression spring bearing (34) against a base (5*a*) of said case.

15. Packaging according to claim 12 wherein the actuator rod is adapted to be automatically connected to the plunger that is captive in the case receiving said cartridge.

16. Packaging according to claim 15 wherein the free end of the actuator rod is protected by the spring, the spring having an opening through which said rod passes freely.

17. Packaging according to claim 1 wherein said spring is a circular arc shaped leaf spring (19*b*) the free ends of which are braced against parallel abutments (20*b*, 21*b*) attached to said plunger (2*b*) and a central part of said leaf spring is fixed to a support (34*b*) upstanding from a top wall of said container (6*b*).

18. Packaging according to claim, 17 wherein said dispensing device carried by said container is a suction-discharge pump (14) with non-return valves (15, 31).

19. Packaging according to claim 17 wherein said dispensing device carried by said container is a slide or other valve type closure device (32), the mobile bottom (7*a*) of said container being acted on at all times by a compression spring bearing (34) against a base (5*a*) of said case.

20. Packaging according to claim 17 wherein the actuator rod is adapted to be automatically connected to the plunger that is captive in the case receiving said cartridge.

* * * * *